Oct. 13, 1959     A. MEULNART     2,908,102
TACKLE FOR LINE-CAST FISHING
Filed Aug. 8, 1957
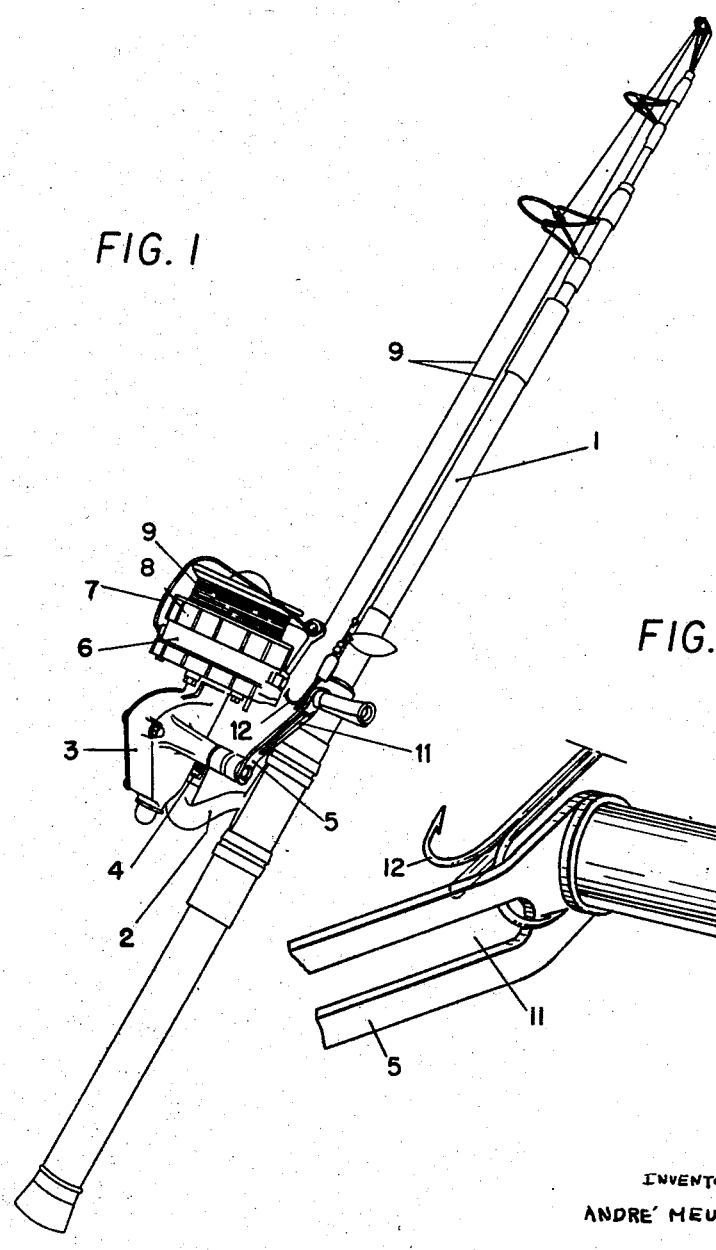
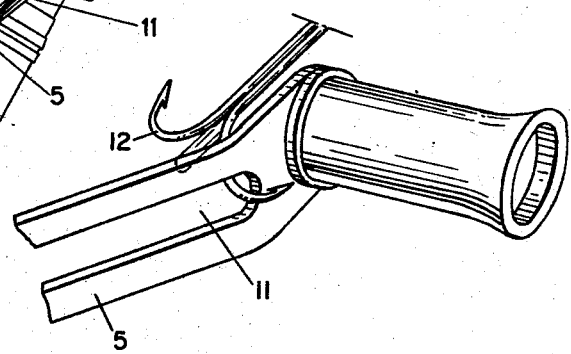
INVENTOR
ANDRÉ MEULNART
By Aaron R. Townshend
ATTORNEY

United States Patent Office 2,908,102
Patented Oct. 13, 1959

2,908,102

TACKLE FOR LINE-CAST FISHING

André Meulnart, Paris, France

Application August 8, 1957, Serial No. 677,102

Claims priority, application France August 21, 1956

1 Claim. (Cl. 43—18)

When telescopic rods fitted with a reel are used for line-cast fishing and are transported in the dismantled condition, i.e. with the reel separated from the rod, the tackle is not ready for immediate use since, before fishing the reel has to be attached to the rod and the line has to be prepared. Moreover, if the telescopic rod is not suitably held, there is the risk of its expanding suddenly and being damaged.

Furthermore, if it is desired to carry the apparatus in the mounted condition, difficulties of different kinds are encountered. Thus, it is preferable to prevent the telescopic rod from expanding inopportunely, the line from becoming unreeled, and the hook from catching in surrounding objects; and, what is more, the body of the reel and its winding handle constitute substantial projections which make the apparatus cumbersome.

If the reel is provided with a check pawl one could contemplate carrying the apparatus already mounted with the hook attached to a link fixed especially for this purpose to the rod in the region of the handle. One could thus, at the same time, prevent the line from becoming unreeled and the rod from expanding provided that one does not forget to engage the check pawl but this does not alter the fact that the body of the reel and its handle are still very cumbersome; the latter could even become accidentally engaged by an object while the rod is being transported and cause an extreme tension in the line thread which might damage the tackle. Moreover, the hook secured against the rod is very liable to become caught in a nearby object which could be most annoying. Finally, the check pawl is not in the correct position for casting since it is engaged by the above-mentioned link; thus thought must be given to disengaging it.

If the reel were not provided with a check pawl, one would not even have recourse to the expedient which has just been described.

The object of the invention is to provide a tackle for line-cast fishing with a telescopic rod which can be transported already mounted in a condition in which its bulk is greatly reduced, without the risk of the line becoming unreeled or of the rod expanding inopportunely or of the hook becoming entangled with nearby objects, while the whole apparatus always remains ready for immediate use.

With this object in view, according to the invention, the apparatus comprises a telescopic fishing rod upon which is mounted a reel constructed and arranged in such a manner as to be foldable against the rod in the direction towards the side on which the winding handle is arranged so that the said handle can be engaged against the rod, the latter then forming an abutment which prevents rotation of the handle in the direction for unwinding the line from the spool, the said handle being formed with an opening adapted to receive the hook attached to the end of the line already mounted on the rod, the said hook being protected on the one side by the rotary drum of the reel, and on the other side by the rod and the handle applied against the latter, while the tensioned line at the same time keeps the telescopic parts of the rod in the closed condition and the handle against the rod.

The invention will now be described by way of example with reference to the accompanying drawing, the single figure of which is a perspective view illustrating one embodiment thereof.

Referring to the drawing, attached to a telescopic fishing rod 1 by means of a reel plate 2 is a reel the body 3 of which is mounted to pivot upon the reel plate 2 about an axis pin 4 disposed substantially parallel to the general direction of the rod. In the drawing, the body 3 of the reel is shown in the position in which it is folded over against the rod but it will be appreciated that when it is in position for use a projection of the median plane of said body will intersect the central axis of the rod. A handle 5 is drivably connected to a rotary drum 6 carrying a pick-up 7 by means of which the line 9 is wound in known manner on a spool 8 which is held stationary for this purpose.

The apparatus is constructed and arranged so that when the body 3 of the reel is folded against the rod 1 the handle 5 engages the rod so that it is prevented from turning in the direction for unwinding the line from the spool. It is thus unnecessary to engage the check pawl which is usually provided on such reels. Moreover, the handle 5 is provided with an opening 11 for engagement by a fish-hook 12 attached to the end of the line 9 which is shown already in position for use on the rod.

The line can be tensioned by turning the spool 8 by hand, which operation is made possible by the presence of a friction slip clutch (not shown) which is inserted in known manner between the rotary drum 6 which carries the pick-up 7 and the said spool.

It can be seen that the line 9, when tensioned in this manner, retains the rod 1 in the folded position and prevents the handle 5 from coming away from the rod since this movement could only occur if an attempt were made to tension the line still further. The bulk of the reel is reduced to a minimum, the handle 5 does not project far from the rod, and the hook 12 is well protected on the one side by the rotary drum 6 of the reel and on the other by the rod 1 and the handle 5 applied against it.

The rod constructed and arranged as described above is always ready for immediate use: all that is necessary for this purpose is to tilt the reel on the axis of the pin 4, disengage the hook 12 from the handle 5, and expand the telescopic rod.

I claim:

Tackle for cast fishing comprising a telescopic fishing rod on which is mounted a reel of the stationary drum type, said reel having a handle and being equipped with a rotary pick-up adapted to be rotated by hand in a given direction for winding a line on a normally non-rotary spool, said spool being held against rotation during casting by a friction device which permits rotation thereof, when desired, to tension said line, said reel being mounted on the rod by means of a support rigid with said rod and on which said reel is pivotally mounted on an axis parallel with the rod in such a manner that when the reel is pivoted toward the rod the handle thereof engages the rod which serves as an abutment adapted to prevent said handle from rotating in a direction reverse to said winding direction, said handle having means for attachment of a hook mounted at the end of a line mounted on the rod, whereby said hook is protected on one side by the reel and on the other by the rod and the handle applied against the latter, while the telescopic parts of the rod are maintained in retracted condition with the handle applied against the rod by said line set under taut condition by the user having rotated the spool against the action of said friction device in the suitable direction.

References Cited in the file of this patent

UNITED STATES PATENTS

| | | |
|---|---|---|
| 1,991,407 | Miller et al. | Feb. 19, 1935 |
| 2,512,170 | Oen | June 20, 1950 |
| 2,648,505 | Mauborgne | Aug. 11, 1953 |
| 2,672,301 | Shelburne | Mar. 16, 1954 |
| 2,725,660 | Costley | Dec. 6, 1955 |
| 2,731,214 | Bogar | Jan. 17, 1956 |
| 2,742,728 | Boyd | Apr. 24, 1956 |